Sept. 12, 1950 J. R. SCHOENBAUM 2,522,139
FREQUENCY RESPONSIVE SYSTEM
Filed Oct. 6, 1944 2 Sheets-Sheet 1
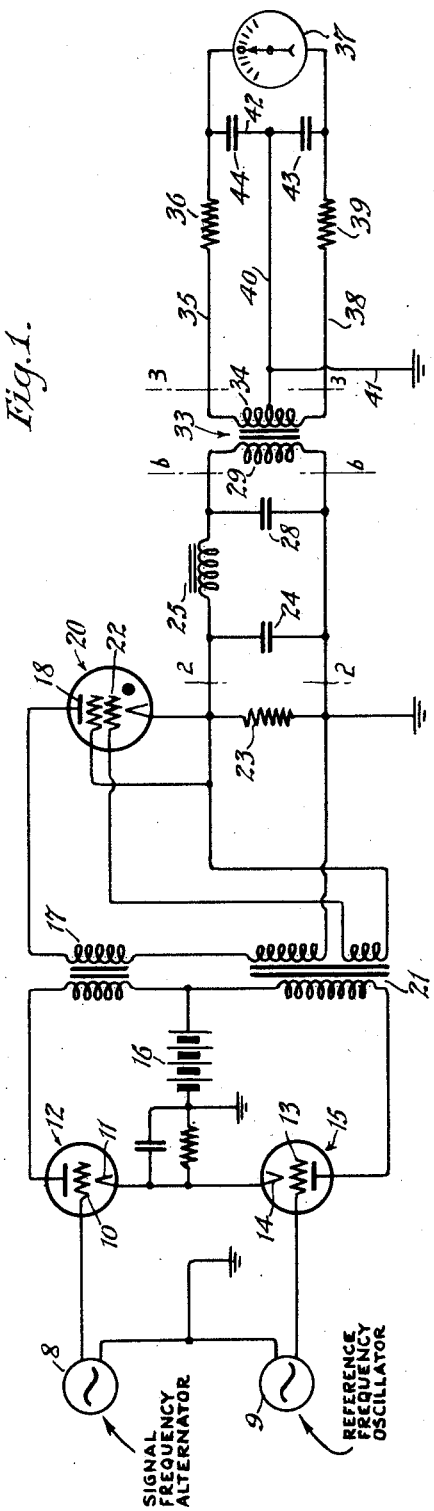
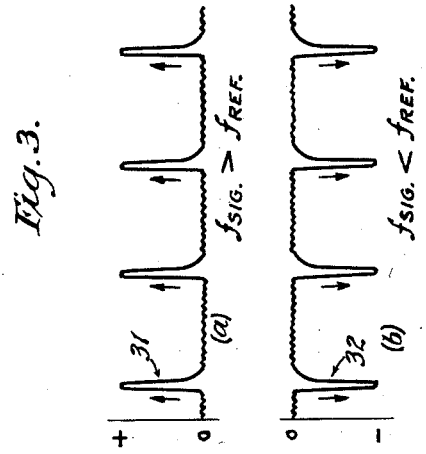
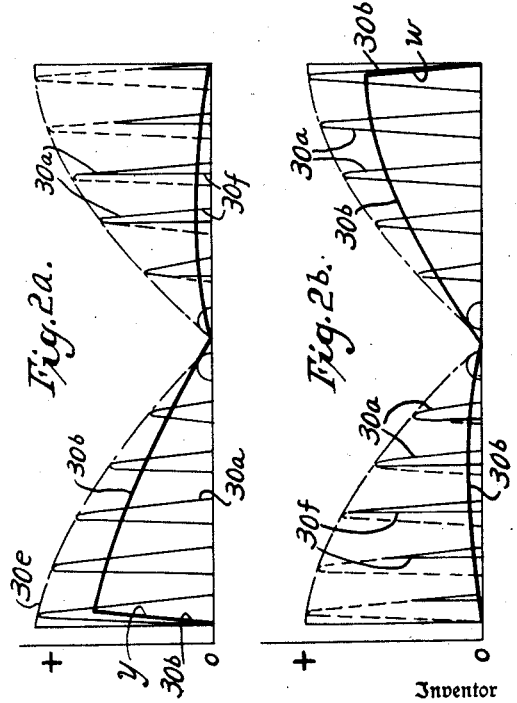
Inventor
JOSEPH R. SCHOENBAUM
Attorney

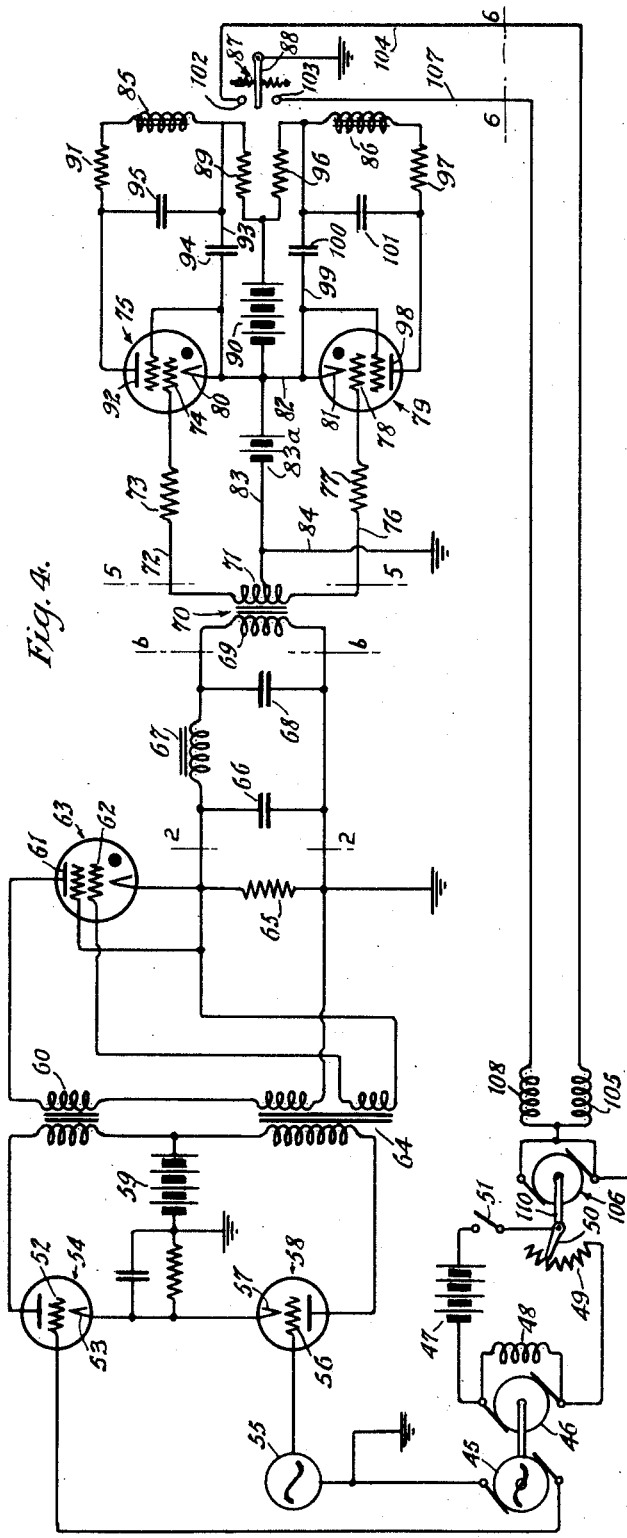
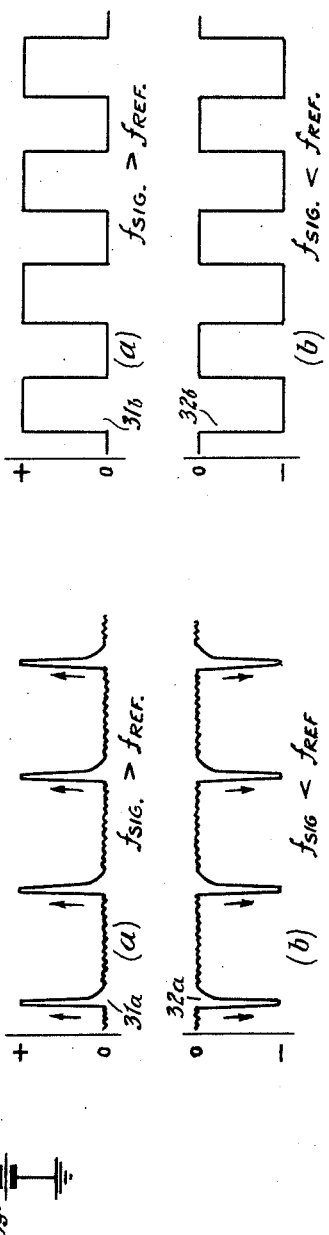
Fig. 4.
Fig. 5.
Fig. 6.
Inventor
JOSEPH R. SCHOENBAUM
Attorney Patented Sept. 12, 1950

2,522,139

UNITED STATES PATENT OFFICE 2,522,139

FREQUENCY RESPONSIVE SYSTEM

Joseph R. Schoenbaum, Roseland, N. J., assignor to Curtiss-Wright Corporation, a corporation of Delaware Application October 6, 1944, Serial No. 557,535

22 Claims. (Cl. 250—27)

This invention relates to a frequency-responsive system and more particularly to a system which is responsive to two or more co-existing frequencies, one of which serves as a reference. Although not necessarily so limited as to such uses, the system may be availed of for comparing, measuring and indicating the difference between a frequency, or frequencies, which may vary, and the reference frequency, or, in response to such difference, to regulate or control the operation of apparatus, being readily adaptable, for example, for automatic-frequency control, whether for broadcasting purposes or otherwise, for controlling the speed of prime movers, directly or indirectly, and, more specifically in the latter connection, for governing the pitch-control motors of variable-pitch propellers of aircraft to regulate and/or synchronize the speed of the engines which are employed to drive the propellers.

One object of the invention is a system wherein provision is made for obtaining electronically a differential response of the character described, whereby to eliminate moving parts and thereby minimize mechanical failure and avoid losses as a result of friction and lags due to inertia.

A further object is to provide a system wherein the response is characteristic not only of the magnitude of the difference between the variable and reference frequencies but is also characteristic of the numerical relation between them, having one response when the variable frequency is greater than the reference frequency and a different response when the variable frequency is less.

A still further object is to provide a system which is highly sensitive and which is responsive to a wide range of frequency differentials.

A still further object is a system which may be adapted with facility to widely different uses, this object contemplating a system wherein the duration of the pulses of the differential frequencies may be predetermined in accordance with the requirements of any particular use without regard to the frequencies or phase relations involved.

A still further object is a novel design and arrangement of the component parts of the system, whereby to obtain economy, compactness and simplicity in design and facilitate and minimize manufacturing, testing and adjusting operations.

The system is illustrated in the accompanying drawings, wherein:

Figure 1 is a wiring diagram of a frequency-differential responsive system embodying the features of the invention;

Figs. 2a and 2b are diagrammatic views of a beat cycle showing the formation of pulses having a discontinuity reversible characteristic, portions of the diagrams having particular references to the circuit sections 2—2 and b—b of Figs. 1 and 4.

Figure 3 is a diagrammatic view of the wave form of a plurality of pulses of a differential frequency after differentiation, the diagrams having reference to the circuit section 3—3 of Fig. 1.

Figure 4 is a wiring diagram of a system modified for the purpose of frequency control; and Figures 5 and 6 are diagrammatic views of the wave form of the pulses as differentiated and lengthened in the latter system, the diagrams having reference to the circuit sections 5—5 and 6—6 respectively of Fig. 4.

The system, as illustrated in Figure 1, includes an alternator 8 having an output, or signal, frequency which may vary and an oscillator 9 which may be adjusted to generate predetermined, stable reference frequencies, it being understood that the variable and reference frequencies may be produced in any suitable manner and that the alternator and oscillator are referred to by way of example only. The alternator is connected between the grid 10 and cathode 11 of a pre-amplifying tube 12 while the reference oscillator is connected between the grid 13 and cathode 14 of a similar tube 15, the plate voltage of the tubes 12 and 15 being furnished by a common battery 16. A transformer 17 couples the plate circuit of the tube 12 and the plate circuit of a gas-filled tube, or thyratron, 20 while a transformer 21 couples the plate circuit of the tube 15 to both the plate and grid circuits of the tube 20. Thus the signal and reference frequencies, after being stepped up in voltage, are applied to the plate 18 of the tube 20, while the reference frequency is applied to the grid 22.

It will thus be apparent that the voltage on the plate 18 of the tube 20 varies in amplitude as a function of the beat between the signal and reference frequencies while the grid voltage is constant. In this connection it is to be understood that the invention not only contemplates the application of both the signal and reference frequencies to the plate of the tube with either also applied to the grid, but also the application of both frequencies to the grid with either also applied to the plate; or the application of either frequency alone to the plate and the other alone to the grid. The voltage across the plate to cathode resistor 23 will, during conducting periods of the tube 20, depend upon which frequency combination is employed and upon whether the signal frequency is equal to, greater than, or less than the reference frequency.

Reference may now be made to Fig. 2a which is based upon the application of the sum of the signal and reference frequencies to the plate of the tube 20 and which is also based upon the application of the reference frequency to the grid of the tube 20, the reference frequency applied to the grid, however, being 180 degrees out of phase with the reference frequency which is combined with the signal frequency and applied to the plate. This arrangement is attained by the two secondaries of the transformer 21 wherein one winding is series connected with the secondary of the transformer 17 and wherein the other secondary winding of the transformer 21 provides grid voltage at reference frequency, this winding being arranged to have 180 degrees phase relation to the other secondary winding of the transformer 21. The plate current which would flow in the tube 20 if the grid were positively biased at all times would correspond to the full rectified waves indicated at 30a, within the envelope curve 30e, this envelope representing the beat frequency between signal and reference frequency. However, with grid control applied by voltage due to reference frequency in 180 degree phase relation to the other component of reference frequency applied to the plate, no current flows in the tube until the grid becomes sufficiently positive to "fire" the tube. When the signal frequency is greater than the reference frequency the instant voltages across the cathode resistor 23 (before averaging to the forms 30b) are represented by the half waves 30a in the left hand half of Fig. 2a and by the half waves 30a as modified at 30f in the right hand half of Fig. 2a. In the first half of the beat cycle shown in Fig. 2a where the signal voltage frequency exceeds the reference frequency, the grid is positive when the plate becomes positive at each half wave 30a and the thyratron "fires" through the entire half of each wave 30a. However, the amplitude of each successive half wave gradually decreases because of the plate voltage composition. In the second half of the cycle, the grid does not become positive to "fire" the tube until after each half wave has commenced, the delay before firing, as at 30f, varying in degree. At the end of the cycle where the amplitude of the half waves 30a is great, the grid becomes positive increasingly later towards the end of each half wave so that the average or integrated value of current passed during one complete beat cycle or wave may be represented by the curve 30b, commencing abruptly at y at the beginning of each cycle and increasing rapidly to a maximum, gradually diminishing to zero during the first half of the cycle, and remaining at a low value during the last half of the cycle or wave. At the end of the cycle, a positive half wave of grid voltage is completely opposed by a negative plate voltage so that no current flows through the thyratron. The next sharp wave front y occurs at the instant a positive half wave of grid voltage overlaps the initial portion of a positive half wave of plate voltage thereby "firing" the thyratron. The action is reversed where the signal frequency is less than the reference frequency as shown in Fig. 2b. There the average current 30b flowing during the first half of the beat cycle or wave is at a low value and gradually increases to a maximum at the end of the second half of the cycle or wave, where it abruptly terminates at w. An abruptly terminated wave front w occurs when a positive half wave of grid voltage slips past a positive half wave of plate voltage thereby cutting off the thyratron. The above described abrupt front changes occur whether the plate frequencies be made up solely of the signal frequency or both signal and reference frequencies as illustrated in the preferred circuit.

The sharply rising and sharply falling fronts y and w respectively represent the useful portions of the differential frequency pulses or waves, the direction of the wave fronts being determinative of whether the signal frequency is greater or less than the reference frequency and each such wave front representing one cycle of difference. Thus for each frequency differential the wave fronts will all be the same direction and in number will be equivalent to the numerical difference between the signal and reference frequencies. At such times as the signal frequency corresponds to the reference frequency the amplitude of the voltage waves 30a will be substantially constant depending upon the phase relation between the two frequencies.

The circuit arrangement for obtaining steep front current pulses or waves of the type shown at 30b in Figs. 2a and 2b comprises a low pass $\pi$ filter connected across the cathode resistance 23 and including condensers 24 and 28 and an inductance 25. This filter functions as a smoothing or integrating circuit in a well known manner for integrating the higher frequency pulses appearing at the circuit section 2—2 so that the resulting wave form at the output terminals of the filter, i. e. the terminals of condenser 28, corresponds to that of the waves 30b, Fig. 2a or Fig. 2b as the case may be. It will be apparent therefore that the sharp or abrupt changes in the waves or pulses from the aforesaid integrating circuit are in one sense when the signal frequency is greater than the reference frequency and are in the opposite sense when the signal frequency is less than the reference frequency. The frequency of the abrupt wave fronts corresponds to the magnitude of the frequency difference. For the best results, the signal and reference frequencies should be high with relation to their difference range. If the two frequencies are multiples the differential will not indicate whether the signal frequency is greater or less than the reference frequency. Preferably the maximum difference between the reference and signal frequencies should not exceed one-tenth the reference frequency. Otherwise the rise and fall of the abrupt portions, i. e. the useful portions, of the pulses may be too gradual.

For the purpose of modifying the waves 30b at the circuit section b—b, Fig. 1, so that they can be more effective for the purpose intended, they are preferably differentiated as to positive and negative direction of the abrupt wave fronts. To this end the waves are passed through a transformer 33, the primary winding 29 of which also serves as the inductance of a tuned circuit including the condenser 28. This circuit is preferably resonant at a frequency about one-tenth the reference frequency. By reason of the rapid rise or decay of current in the primary 29 at a steep front y or w respectively, the corresponding rapid flux change at the transformer primary induces a voltage in the secondary winding 34 that is differentiated as to positive and negative pulses. The wave form of this induced voltage at the circuit section 3—3 is peaked or sharpened into pulses as illustrated by Fig. 3 wherein the curves (a) represent for example positive pulses produced according to a sharply initiated current wave, Fig. 2a and the curves (b) represent for example negative pulses produced according to a sharply terminated current wave, Fig. 2b. That is, since the magnitude and polarity of induced voltage in the transformer secondary is dependent respectively on the rate and direction of change of primary flux, it will now be apparent that the transformer 33 functions as a useful differentiating device for the waves or pulses 30b. The voltage induced by the gradually changing flux, as distinguished from the rapidly changing flux, is much lower in magnitude and is not a determining factor in the differentiation of the pulses.

The differentiated positive and negative pulses can now be used for frequency indication or control as desired, the arrangement in Fig. 1 including a D. C. meter 37 responsive to positive and negative current inputs, the meter reading zero at zero input, for indicating whether the signal frequency is greater or less than the reference frequency. The terminals of the transformer secondary 34 are connected respectively to the terminals of the meter 37 by a conductor 35 and resistance 36 at one side and by a conductor 38 and resistance 39 at the other side, the secondary winding 34 also having a mid-tap connection that is grounded by conductor 41. The mid-tap is also connected by conductors 40 and 42 to the common terminal of a pair of series-connected condensers 43 and 44 that are connected across the terminals of the meter 37. These condensers function together with the resistances 36 and 39 as integrating means for smoothing respectively the sharp positive and negative pulses of Fig. 3.

Accordingly the waves 30b having sharply rising wave fronts will cause deflection of the indicator of the meter 37 in a positive direction indicating that the signal frequency is greater than the reference frequency as will be noted by the positive pulses of Fig. 3, whereas waves having sharply falling wave fronts cause deflection of the indicator in the negative direction indicating that the signal frequency is less than the reference frequency, the magnitude of the deflection corresponding to the average current and the latter in turn corresponding to the frequency of the pulses. Thus by properly calibrating the meter in units of frequency, the meter will indicate the sense of the difference between the signal and reference frequencies and also the magnitude of such difference.

The invention also contemplates the use of differentiated pulses having directionally-significant wave fronts for regulating and control purposes and is so illustrated in Figures 4, 5 and 6. In this embodiment, the differential frequency is utilized to control the signal frequency so that the latter will be synchronized with the reference frequency. To this end, the system includes an alternator 45 for generating the signal frequency. The alternator is driven by a motor 46. Hence the output frequency of the alternator depends upon, and varies as, the speed of the motor. A battery for energizing the latter is indicated at 47, the field winding for the motor being indicated at 48. In order that the speed of the motor 46 may be regulated, a variable resistance 49 is connected in series with the field winding 48, the motor circuit also including an adjustable contact arm 50 and a switch 51.

The alternator 45 is connected between the grid 52 and the cathode 53 of a pre-amplifying tube 54 while a reference oscillator 55 is connected between the grid 56 and the cathode 57 of a similar tube 58, the plate voltage for the two tubes being furnished by a common battery 59. As in the embodiment first described, a transformer 60 couples the plate circuit of the tube 54 to the plate circuit of a thyratron 63 while a transformer 64 couples the plate circuit of the tube 58 to both the plate and grid circuits of the thyratron. Thus the signal and reference frequencies are applied to plate 61 of the thyratron while the reference frequency is applied to the grid 62.

As heretofore described, the voltage on the plate 61 of the thyratron varies in amplitude as a function of the beat between the signal and reference frequencies while the grid voltage is constant. The voltage across the cathode resistor 65 therefore, during conducting periods of the thyratron 63, will depend upon the particular frequency combination employed. Assuming the frequency combination to be that illustrated, then when the signal frequency is greater than the reference frequency, the voltage across the cathode resistor at the circuit section 2—2 will correspond to, and vary as, the rectified plate current and have the wave form shown at 30a in Fig. 2a, these high frequency voltages then being smoothed or integrated in the manner previously described by the condensers 66 and 68 and an inductance 67 of a low pass filter. As explained above in connection with Fig. 1, the waves or pulses at the circuit section b—b produced by the low pass π filter connected across the cathode resistor 65 have either sharply initiated or sharply terminated wave fronts according to whether the signal frequency is greater or less than the reference frequency and these pulses are differentiated by the transformer 70 in the manner indicated by Fig. 5 to produce at the circuit section 5—5 sharp positive or negative pulses 31a or 32a respectively, according to the change of flux in the primary winding 69. The primary winding 69 also forms with the condenser 68 a tuned circuit as in the case of Fig. 1.

The differentiated pulses 31a and 32a have such a short duration that for some purposes it will be preferred, and for some purposes necessary, that their duration be extended. To this end, in the embodiment shown in Figure 4, one side of the secondary 71 of the transformer is connected by a wire 72 through a grid-current limiting resistance 73 to the grid 74 of a gas-filled tube 75 while the other side of the secondary is connected by a wire 76 through a grid-current limiting resistance 77 to the grid 78 of a similar tube 79. The cathodes 80 and 81 of the two tubes are connected by a wire 82 which in turn is connected by a wire 83 through a grid bias battery 83a to a center tap on the secondary 71 and to ground by a wire 84.

The tubes 75 and 79 control energization of opposing coils 85 and 86, respectively, of a polarized relay 87, the movable contact 88 of which is biased to the position shown and connected to ground. The coil 85 is included in the plate circuit of the tube 75, being in series with a resistance 89 which is connected to the positive side of a battery 90 and also being in series with a second resistance 91 which is connected to the plate 92 of the tube 75. A line 93, which is connected between the coil 85 and the resistance 89, is connected to one side of a condenser 94, the other side of which and the negative side of the battery are connected to the cathode line 82. One side of a second condenser 95 is connected between the resistance 91 and the plate 92 while the other side is connected between the opposite side of the coil 85 and the condenser 94. In a like manner the coil 86 is included in the plate circuit of the tube 79, being in series with a resistance 96 which is connected to the positive side of the battery 90 and also being in series with a resistance 97 which is connected to the plate 98 of the tube 79. A line 99, which is connected between the coil 86 and the resistance 96, is connected to one side of a condenser 100, the other side of which is connected to the cathode line 82. One side of a cooperating condenser 101 is connected between the resistance 97 and the plate 98 while the other side is connected between the opposite side of the coil 86 and the condenser 100.

The grids of the tubes 75 and 79 are biased, as shown, so that oscillation will be prevented, the tubes being conductive only when the proper voltages are impressed upon their grids. Such voltages are furnished by the transformer 70, it being apparent from the foregoing that pulses having a polarity in one sense will render the tube 75 conductive while pulses having a polarity in the opposite sense will render the tube 79 conductive. Thus when a differentiated pulse of the proper polarity is applied to the grid 74 of the tube 75 and the latter is thereby rendered conductive, a surge of current will flow through the coil 85 to move the contact 88 into engagement with a stationary contact 102 and the relay 87. For the purpose of controlling the operating time of the relay, means are provided for stopping tube conduction and for maintaining the relay coil 85 energized a predetermined time after the tube stops conducting. A time delay circuit including the aforesaid condenser 95 and resistance 91 is associated with the coil 85 so that when the tube 75 fires, the sudden flow of current through the resistances 89 and 91 which are in series with the coil 85, together with the discharge of the condenser 94 which occurs upon firing of the tube drive the plate 92 negative in a short time interval and thus render the tube non-conductive and restore grid control. The resistance 89, which may be varied, controls the discharge rate of condenser 94 and hence the duration of tube conduction. When the tube 75 stops conducting the condenser 94 recharges from the battery 90 through and at a rate dependent on the value of the resistance 89. Also, after the tube is rendered non-conductive, the condenser 95 which has become charged due to tube conduction discharges through the coil 85 and resistor 91 at a rate determined in part by the value of the resistance 91 and thus maintains the coil 85 energized and the contact 88 in engagement with the contact 102 for a desired period. Accordingly, the duration of pulses 31b, Fig. 6, is composed of two components, namely the conducting time of the tube and the decay time of the network including the elements 95, 91 and 85. The pulses 32b are formed in the same manner by operation of the tube 79 and associated components.

In a like manner, when the tube 79 is rendered conductive by the application of a pulse of the opposite polarity to the grid 78, there will be a surge of current through the coil 86 and, the latter being energized, the contact 88 will be moved into engagement with a stationary contact 103. The sudden flow of current through the resistances 96 and 97, which are in series with the coil 86, and the discharge of the condenser 100 drive the plate 98 negative and thus render the tube 79 non-conductive and restore the control of the grid 78. In this case also, the condenser 101 discharges through the coil 86 at a rate determined by the value of the resistance 97 and maintains the coil 86 energized and the contact 88 in engagement with the contact 103 for the desired period.

Thus it will be noted that the periods during which the coils 85 and 86 are energized are not dependent upon the duration of the differentiated pulses and may be predetermined independently by the selection of the proper values of the resistances 91 and 97 and the condensers 94, 95, 100 and 101. For example, for each differentiated pulse 31a or 32a, as the case may be, a pulse 31b or 32b (Figure 6) of substantially greater duration may be caused to traverse a coil of the relay 87. Hence, when the difference between the signal and reference frequencies is low the movable contact 88 of the relay will close momentarily for each cycle of difference and then open. On the other hand, if the difference between the signal and reference frequencies is substantial then the movable contact will remain closed as a new surge of current will be furnished the holding coil and the associated condensers before the latter lose their charge from the preceding surge. In other words, the movable contact will vibrate between open and closed positions when the differential frequency is low and assume a continuously closed position when the differential frequency is higher than a predetermined value.

A line 104 leads from the stationary contact 102 of the relay 87 to one side of a field winding 105 of a motor 106 while a line 107 leads from the other stationary contact of the relay to a reversely wound field 108 of the motor, current being supplied to the latter from a battery 109, one side of which is grounded. The control circuit section 6—6 can also be represented as energized by pulses corresponding to those of Fig. 6. A suitable drive 110 connects the motor 106 to the contact arm 50 so that when the motor runs in one direction the contact arm will be moved to include more of the resistance 49 in the circuit of the field winding of the motor 46 and when it runs in the opposite direction the contact arm will be moved to cut out resistance 49.

In the operation of the system, assuming for example, that the signal frequency is less than the reference frequency, and that in response to the differentiated pulses of the differential frequency the movable contact 88 of the relay 87 is caused to engage, intermittently or continuously, as heretofore described, the stationary contact 102, then the field winding 105 of the motor 106 will be energized. Thereupon, the motor 106 will be caused to run in the direction which will actuate the contact arm 50 in such a manner as to cut out some of the resistance 49. Thereby the speed of the motor 46 will be increased as will that of the alternator 45. The signal frequency will thus be increased and will continue to be increased until it and the reference frequency are the same. On the other hand, assuming that the signal frequency is higher than the reference frequency and that in response to the differentiated pulses of the differential frequency the movable contact 88 of the relay 87 is caused to engage, intermittently or continuously, the stationary contact 103, then the field winding 109 of the motor 106 will be energized. In this case the motor 106 will be caused to run in an opposite direction and the contact arm 50 will be actuated in such a manner as to cut in more of the resistance 49. Hence the speed of the motor 46 will be reduced as will that of the alternator 45. The signal frequency will, therefore, be reduced, and will continue to be reduced, until it and the reference frequency are the same. The system, therefore, is automatically operative to correct the signal frequency so that it will correspond to the reference frequency, if the reference frequency is fixed, and to follow the reference frequency in case the latter should vary.

It is to be understood that the forms of the invention shown and described herein are intended by way of example only and that various other forms, all within the purview of the invention, may be suggested, and availed of, in connection with various other adaptations.

What is claimed as new and desired to be secured by Letters Patent, is:

1. A frequency responsive system comprising means for generating a variable frequency, means for generating a reference frequency, a grid glow electron tube having a cathode, plate and grid, one of said frequencies being applied to said plate and the other being applied to said grid, whereby to mix said frequencies and to produce a third frequency wave which is the difference between the variable and reference frequencies, filter means associated with the output of said electron tube for shaping said third frequency into pulses of one wave front shape type when the variable frequency is greater than the reference frequency and of a different wave front shape type when the variable frequency is less, and means selectively responsive to said pulses in accordance to their type.

2. A frequency responsive system comprising means for generating a variable frequency, means for generating a reference frequency, means for combining said frequencies to produce a third frequency composed of pulses the number of which corresponds to the difference between the variable and reference frequencies and the pulses of which are of one wave form type when the variable frequency is greater than the reference frequency and of a different wave form type when the variable frequency is less and of a substantially uniform amplitude unaffected by the difference between said variable and reference frequencies, and sensing means selectively responsive to said pulses in accordance to their type, said last mentioned means being intermittently responsive when said pulses are below a predetermined frequency and continuously responsive when said pulses are above a predetermined frequency.

3. A frequency responsive system comprising means for generating a variable frequency, means for generating a reference frequency, means for combining said frequencies to produce pulses at a third frequency which corresponds to the difference between the variable and reference frequencies and the pulses having an abrupt initiation when the variable frequency is greater than the reference frequency and having an abrupt termination when the variable frequency is less, the magnitude of said pulses being substantially unaffected by the degree of difference between the variable frequency and reference frequencies and means responsive to said pulses in accordance to their abrupt initiation or termination for controlling said first mentioned means to synchronize the variable frequency with the reference frequency, said responsive means being responsive intermittently when said pulses are below a predetermined frequency and continuously when said pulses are above a predetermined frequency.

4. A frequency response system comprising in combination a source of constant frequency energy, a source of variable frequency energy in the range of the frequency of the constant frequency source, and means comprising a single space discharge tube having its plate connected to one of said sources and its control element connected to the other the tube being connected with integrating means to produce pulses of current proportional in number to the frequency of the beat between said frequencies, each of said pulses varying gradually but initiating or terminating abruptly so as to represent a distinct pulse type in accordance to whether the variable frequency is greater or less than the constant frequency and differentiating means for distinguishing between the aforesaid types of pulses connected to and fed by said integrating means.

5. In a frequency responsive system means for deriving a beat frequency from two alternating current frequencies, said means including a thyratron with one of said frequencies being applied to the plate and the other to the grid, said beat frequency being composed of wave forms having a sharp rise or a sharp fall substantially coincident with the establishment of a phase relation of 180° between the two voltages of the alternating current frequencies, the form depending upon whether the grid voltage frequency advances or recedes with respect to the other frequency to cause a single sharp rise, or to cause a single sharp fall in each beat frequency cycle and means sensitive to said sharp rises and falls to induce a current for each sharp rise or fall, the direction of flow of which depends upon whether a sharp rise or a sharp fall is occurring whereby to represent the magnitude and sense of difference between said alternating current frequencies.

6. A frequency responsive system comprising means for generating an alternating current signal frequency, and means for combining said frequency with a frequency composed at least in part by an alternating current reference frequency to produce a third frequency corresponding to the numerical relation between the signal and second named frequency, integrating means energized by the third frequency current for producing pulses of two types having an abrupt initiation or termination respectively and otherwise graduated variation, said initiation or termination occurring once each time the signal frequency slips through opposed phase relation to the second named frequency, the type depending upon the direction of slip and means responsive to said pulses according to the respective type thereof.

7. A frequency responsive system comprising a source of reference frequency and a source of signal frequency the latter having a range of change above and below the reference frequency, means for combining said frequencies to produce waves which occur at a frequency numerically equal to the difference between the signal and reference frequencies, said waves having different distinguishing shape characteristics according to the sense of said difference, means to discriminate said waves according to the aforesaid shape characteristics and to produce differentiated polarized pulses therefrom, and means responsive to the pulses in degree according to the frequency of said pulses and in sense according to whether the signal frequency is greater or less than the reference frequency.

8. A system which is responsive to coexisting variable and reference frequencies comprising means for combining said frequencies to produce waves which occur at a frequency which is numerically equal to the difference between the variable and reference frequencies, said means including means for shaping said waves so as to define individual waves of two distinct types, one type having an abrupt and steep initial slope and a comparatively gradual termination and the other type having conversely a gradual initiation and an abrupt termination, said types being according to whether the variable frequency is greater or less than the reference frequency, and means selectively responsive to said waves according to the respective type of wave front.

9. A frequency responsive system comprising means for generating variable and reference frequencies, means for combining said frequencies, means for filtering the combined frequencies to suppress all except a beat frequency which is equal to the numerical difference between the variable and reference frequencies, the waves of said beat frequency each being characterized as types by one front having a high positive or a high negative slope as compared with the opposite front and being of one type when the variable frequency is greater than the reference frequency and of the other type when the variable frequency is less than the reference frequency, means for differentiating said waves as to sense according to said slope to produce pulses, modifying means for increasing the duration of the pulses a predetermined extent and means responsive to said modified pulses according to whether the variable frequency is greater or less than the reference frequency.

10. A frequency responsive system comprising means for generating a variable frequency, means for generating a reference frequency, mixing means including a single electron tube having as elements a cathode, plate and grid, means for applying both of said frequencies to one of said elements and one of said frequencies to another of said elements for producing a beat frequency wave which is equal to the numerical difference between the variable and reference frequencies, integrating means associated with the output of said tube for shaping the waves of said beat frequency so that they are of one wave front shape when the variable frequency is greater than the reference frequency and of a different wave front shape type when the variable frequency is less than the reference frequency, and means responsive to said waves according to their respective shapes.

11. In a system having a source of constant frequency energy and a source of variable frequency energy, the method of comparing said frequencies which comprises beating electrical oscillations of the respective frequencies to obtain a beat frequency output, suppressing substantially all frequencies of said output except a beat wave representing the difference between said constant and variable frequencies, said beat waves characterized by a wave front having either a high positive or a high negative slope, and differentiating the high slope wave fronts of respective waves as to sense for determining whether said variable frequency is greater or less than said constant frequency.

12. In a system having a source of constant frequency energy and a source of variable frequency energy, means to beat electrical oscillations of the respective frequencies to obtain an output consisting of pulses of varying magnitude and duration, the average wave of said pulses representing the beat frequency and having a sharply initiated or sharply terminated wave front according to whether the signal frequency is greater or less than the reference frequency, means to suppress substantially all frequencies of said output except said average wave representing the numerical difference between said constant and variable frequencies and to form said beat waves with a wave front having either a high positive or a high negative slope accordingly as the variable frequency is greater or less than the constant frequency, and means to differentiate the high slope wave fronts of respective waves as to sense for determining whether said variable frequency is greater or less than said constant frequency.

13. A system which is responsive to coexisting frequencies, one of which serves as a signal frequency and another as a reference frequency comprising means for combining said frequencies to produce waves which occur at a frequency which is numerically equal to the difference between the signal and reference frequencies, said waves having different characteristic wave form shapes according to the sense of said difference, means for differentiating said waves according to the wave form shape characteristic to produce differential polarized pulses, and means responsive to the differentiated polarized pulses in degree according to the frequency of said pulses and in sense according to whether the signal frequency is greater or less than the reference frequency.

14. A system which is responsive to coexisting frequencies, one of which serves as a signal frequency and another as a reference frequency comprising means for combining said frequencies to produce waves which occur at a frequency which is numerically equal to the difference between the signal and reference frequencies, said waves being distinguished as to type by having either a sharply rising or a sharply falling wave front according to the sense of said difference, means for differentiating said waves as to polarity according to the type of wave front to produce differentiated pulses, and means responsive to the differentiated pulses in degree according to the frequency of said pulses and in sense according to whether the signal frequency is greater or less than the reference frequency.

15. A system which is responsive to coexisting frequencies, one of which serves as a signal frequency and another as a reference frequency comprising means for combining said frequencies to produce pulses variable in magnitude and duration, the average wave of said pulses representing the beat frequency of said coexisting frequencies, a filter circuit connected to the output of said combining means for suppressing substantially all except said beat frequency and producing waves having either an abruptly rising or abruptly falling wave front according to whether the signal frequency is greater or less than the reference frequency, means for differentiating said waves according to the type of wave front to produce differentiated polarized pulses, and means selectively responsive to said differentiated polarized pulses in degree according to the frequency of said pulses and in sense according to whether the pulses are of positive or negative initial polarity.

16. A frequency responsive system comprising separate sources of variable and reference frequencies, means for combining said frequencies, means for filtering the combined frequencies to suppress substantially all except a frequency which is equal to the numerical difference between the variable and reference frequencies, the waves of said difference frequency each being characterized by one front having a high positive or a high negative slope as compared with the opposite front and being of one type when the variable frequency is greater than the reference frequency and of the other type when the variable frequency is less than the reference frequency, a transformer connected to the output of said filtering means for differentiating said wave fronts as to sense to produce differentiated polarized pulses, and means responsive to said differentiated polarized pulses.

17. A system which is responsive to coexisting frequencies, one of which serves as a signal frequency and another as a reference frequency comprising rectifying means for one of said frequencies, means responsive to the other frequency acting upon said rectifying means for limiting the conduction of said rectifying means to the one frequency half cycle period or part thereof following alternate changes of polarity of potential of said other frequency, means to average the rectifier output to produce waves of rectified pulsating direct current corresponding to the numerical difference between said frequencies said waves having abrupt beginnings or endings, the abrupt beginning or ending respectively of said direct current waves being according to the sense of said difference, means for differentiating said waves according to the sense of the aforesaid abrupt change to produce pulses, and means responsive to the differentiated pulses in degree according to the frequency of said pulses and in sense according to whether the signal frequency is greater or less than the reference frequency.

18. A frequency responsive system comprising a source of A. C. signal frequency, a source of A. C. reference frequency, an electronic gas containing tube having a grid, plate and cathode, means for exciting the grid with one of said frequencies and the plate with the other, a filter circuit connected in parallel with a load impedance in the plate-cathode circuit for filtering out the signal and reference frequencies and producing direct current waves of a frequency equal to the beat frequency, each wave beginning or ending abruptly when the signal and reference frequencies pass through opposition phase relation depending upon whether the grid frequency is greater or less than the plate frequency, and means sensitive to rapid rise or fall respectively of the wave current for distinguishing the abrupt wave beginnings or endings as to sense.

19. A frequency responsive system comprising a source of A. C. signal frequency, a source of A. C. reference frequency, mixing means energized by said frequencies for producing a beat frequency, a filter circuit connected to the output of said mixing means for filtering out the signal and reference frequencies and producing pulsating direct current waves at a frequency equal to the beat frequency, each wave beginning or ending abruptly as a result of the signal and reference frequencies passing through opposition phase relation depending upon whether the signal frequency is greater or less than the reference frequency, sensing means responsive to said abrupt wave beginnings or endings for producing current pulses depending in polarity on whether the wave current is sharply rising or falling, and means including a resistance-capacitance timing circuit for supplementing and prolonging the duration of said pulses for a predetermined period.

20. A frequency responsive system comprising a source of A. C. signal frequency, a source of A. C. reference frequency, a gaseous discharge tube having a grid, plate and cathode, means for exciting the grid with one of said frequencies and the plate with the other frequency, a filter circuit connected to the plate-cathode circuit for filtering out the signal and reference frequencies and producing pulsing direct current waves of a frequency equal to the beat frequency, each wave beginning or ending with an abrupt current rise or fall corresponding to the current rise and fall of the frequency applied to said plate when the signal and reference frequencies pass through opposition phase relation depending upon whether the grid frequency is greater or less than the plate frequency, a transformer having its primary connected to the output of said filter to receive said pulsing direct current, said transformer having a secondary in which a voltage peak is induced depending in polarity on whether the respective D. C. wave has a sharply rising or sharply falling wave front, and a pair of output circuits connected to the transformer secondary, one responsive to voltage peaks of one polarity and the other responsive to voltage peaks of opposite polarity.

21. A frequency responsive system comprising a source of A. C. signal frequency, a source of A. C. reference frequency, a gaseous discharge tube having a grid, plate and cathode, means for exciting the grid with one of said frequencies and the plate with the other frequency, a low pass filter circuit operatively connected to the plate-cathode circuit of said tube for filtering out the signal and reference frequencies and producing pulsing direct current waves of a frequency numerically equal to the difference between said signal and reference frequencies, each wave either beginning abruptly and ending gradually or beginning gradually and ending abruptly, the abrupt changes occurring when the said frequencies pass through opposition phase relation depending upon whether the grid frequency is greater or less than the plate frequency, a transformer having its primary connected to the output of said filter to receive said pulsing direct current, said transformer having a secondary in which a voltage peak is induced depending in polarity on the sense of the slope of the abrupt front of the respective wave, and a pair of output circuits connected to the transformer secondary, one responsive to voltage peaks of one polarity and the other responsive to voltage peaks of opposite polarity, each of said last named circuits including means adapted to supplement the respective peak impulses by control impulses of substantially uniform duration.

22. A frequency responsive system comprising separate sources of variable and reference frequencies, means for combining said frequencies, means for filtering the combined frequencies to suppress substantially all except a frequency which is equal to the numerical difference between the variable and reference frequencies, the waves of said difference frequency each having a different type of wave front shape and being of one type when the variable frequency is greater than the reference frequency and of the other type when the variable frequency is less than the reference frequency, means for differentiating said wave fronts as to sense to produce differentiated pulses, means for modifying said differentiated pulses and increasing the duration thereof including a pair of gaseous discharge tubes responsive respectively to differentiated pulses of opposite sense and a condenser-resistance network associated with each of said tubes arranged to stop conduction of the respective tube after it fires in response to a differentiated pulse and to thereupon supply auxiliary current from said network, and means responsive to said modified pulses according to whether the variable frequency is greater or less than the reference frequency.

JOSEPH R. SCHOENBAUM.

REFERENCES CITED

The following references are of record in the file of this patent:

UNITED STATES PATENTS

| Number | Name | Date |
| --- | --- | --- |
| 2,171,536 | Bingley | Sept. 5, 1939 |
| 2,207,540 | Hansell | July 9, 1940 |
| 2,221,517 | Holters | Nov. 12, 1940 |
| 2,281,995 | Purington | May 5, 1942 |
| 2,291,558 | Peterson | July 28, 1942 |
| 2,304,134 | Wirkler | Dec. 8, 1942 |
| 2,324,077 | Goodale et al. | July 13, 1943 |
| 2,337,328 | Hathaway | Dec. 21, 1943 |
| 2,363,835 | Crosby | Nov. 28, 1944 |
| 2,407,140 | Coake | Sept. 3, 1946 |
| 2,416,517 | Farrow | Feb. 25, 1947 |
| 2,442,786 | Somers | June 8, 1948 |